US011709971B2

(12) United States Patent
Aue et al.

(10) Patent No.: US 11,709,971 B2
(45) Date of Patent: Jul. 25, 2023

(54) METHOD FOR DETECTING AN UNAUTHORIZED PHYSICAL ACCESS TO A BUS SYSTEM

(71) Applicant: Robert Bosch GmbH, Stuttgart (DE)

(72) Inventors: Axel Aue, Korntal-Muenchingen (DE); Eugen Becker, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 110 days.

(21) Appl. No.: 17/450,393

(22) Filed: Oct. 8, 2021

(65) Prior Publication Data

US 2022/0138350 A1     May 5, 2022

(30) Foreign Application Priority Data

Nov. 4, 2020 (DE) .......................... 102020213893.1

(51) Int. Cl.
     *G06F 21/85*      (2013.01)
(52) U.S. Cl.
     CPC ..................... *G06F 21/85* (2013.01)
(58) Field of Classification Search
     CPC ............................... G06F 21/554; G06F 21/85
     See application file for complete search history.

(56) References Cited

U.S. PATENT DOCUMENTS

2014/0359180 A1\* 12/2014 Aue .................... G06F 13/4004
                                                                                710/107
2015/0200956 A1\* 7/2015 Koide ................. H04L 63/1416
                                                                                726/22
2019/0364054 A1\* 11/2019 Kneib .................... H04L 63/08

FOREIGN PATENT DOCUMENTS

| DE | 102013210182 A1 | 12/2014 | |
|---|---|---|---|
| DE | 102017208547 A1 | 11/2018 | |
| DE | 102018208118 A1 | 11/2019 | |
| JP | 2002342279 A * | 11/2002 | ......... H04L 12/2602 |

OTHER PUBLICATIONS

Translation of JP-2002342279-A (Year: 2002).\*

\* cited by examiner

*Primary Examiner* — Henry Tsai
*Assistant Examiner* — John B Roche
(74) *Attorney, Agent, or Firm* — Norton Rose Fulbright US LLP; Gerard Messina (57) ABSTRACT

A method for detecting an unauthorized physical access to a bus system. The method includes detecting a test level sequence in the voltage signal; constituting a binary sampled pattern by sampling the voltage signal at specified pattern times associated with the detected test level sequence, and assigning a first value if the voltage signal is above a predefined voltage threshold at the respective pattern time, and a second value if the voltage signal is not above the voltage threshold; comparing the sampled pattern with a reference pattern that is associated with the detected test level sequence and that was constituted for the test level sequence as a sampled pattern in a state of the bus system during which no unauthorized access existed; and determining that a possible unauthorized physical access exists if the reference pattern does not match the sampled pattern.

17 Claims, 5 Drawing Sheets

METHOD FOR DETECTING AN UNAUTHORIZED PHYSICAL ACCESS TO A BUS SYSTEM

CROSS REFERENCE

The present application claims the benefit under 35 U.S.C. § 119 of German Patent Application No. DE 102020213893.1 filed on Nov. 4, 2020, which is expressly incorporated herein by reference in its entirety.

FIELD

The present invention relates to a method for detecting an unauthorized physical access to a bus system, and to a computation unit and a computer program for carrying it out.

BACKGROUND INFORMATION

Programmable control devices are used in machines and motor vehicles in order to control them or their components. A motor vehicle, for example, can contain control devices for engine control, for the braking system, etc. The control devices encompass a microcontroller or processor having one or, typically, several processor cores that execute programs stored in a memory in order to implement the functions of the control device.

The control devices can be connected to one another and to further devices, for example sensors, via a bus. One widespread bus is, for example, the controller area network (CAN) bus, a bus based on differential voltages which transfers data or messages via two bus lines; bus leads and bus subscribers together constitute a bus system. The data to be transferred can be encoded in order to prevent an attacker who has access to the physical layer, in particular the bus leads, from manipulating the transferred data or introducing his or her own data.

Regardless of encoding, an attacker should nevertheless be prevented from gaining access to the physical layer, since he or she on the one hand can listen into data transfers and, in a context of a large number of data transfer, might possibly crack the code; and on the other hand the attacker can overwhelm the bus with messages and thereby impair the functionality of the bus system. The latter represents a danger especially for the CAN bus, since in this bus each message has a specific priority, defined by the transmitter, according to which bus bandwidth is used; in other words, only the message having the highest priority is transferred in each case. The attacker could therefore bring data transfer between control devices to a halt by flooding the bus with high-priority messages.

German Patent Application Nos. DE 10 2017 208 547 A1 and DE 10 2018 208 118 A1 describe methods according to which characteristics, for example signal edges, of a transfer of a message via a network are evaluated, the origin of the message being determined, or the message being authenticated, based on the characteristics.

BACKGROUND INFORMATION

The present invention provides a method for detecting an unauthorized physical access to a bus system, and a computation unit and a computer program for carrying it out. Advantageous embodiments of the present invention are disclosed herein.

According to an example embodiment of the present invention, for a test level sequence detected in the voltage signal of the bus, a binary sampled pattern constituted therefrom by sampling at specified pattern times is compared with a corresponding reference pattern, a possible unauthorized physical access to the bus system, i.e., an access to the physical layer of the bus system, for instance mechanical contact with the bus leads by a device, being identified or determined if the sampled pattern does not conform to the reference pattern. The voltage signal is evaluated at the predefined pattern times, one digit of the binary sampled pattern having a respective first value allocated to it if the voltage signal at the respective pattern time is above a predefined voltage threshold, and a second value being allocated if the voltage signal at the respective pattern time is not above the voltage threshold.

The basis of the method is that the voltage signal contains interference, for instance voltage oscillations after an edge in the voltage signal, which is reflected in the sampled pattern if the pattern times are suitably selected. This interference, and thus the sampled pattern, changes depending on the specific design of a bus system. The interference is characteristic of the particular bus system and cannot be predicted by an attacker. The invention thus makes it easier to detect attacks on the physical layer of the bus system, for instance by the fact that an attacker connects a device to the bus lead.

The use of binary sampled patterns and reference patterns makes possible a rapid comparison of those patterns without requiring high computing performance for that purpose. In particular, sampled patterns and reference patterns can be implemented and stored as bit patterns. The comparison can then be made in simple fashion by way of an XOR (exclusive OR) operation or bit pattern.

A test level sequence can have several reference patterns associated with it in order to take into account certain variations in the bus system, for example with regard to different bus subscribers, to which slightly different interference corresponds, for instance if different bus subscribers generate edges of differing slopes in the voltage signal.

The term "level sequence" is intended to refer to a specified sequence of levels in the voltage signal with which data or bus control signals are encoded in accordance with the bus specification. A level sequence encompasses one or several level transitions. A level sequence can therefore have a specified meaning allocated to it in accordance with the bus specification, for instance a bit having a specified value or several bits having specified values; bus control signals can also be involved, for example a level sequence that signals the end of a message. An individual level transition, for instance a falling edge from a High level to a Low level, also already constitutes a level sequence. A falling edge that is followed after a specified time ($t_{bit}$) by a rising edge also represents a level sequence. Whether a level sequence is present, and of what kind, generally cannot be ascertained until the level sequence is complete, for instance when several successive bits having the logical value 1 are transmitted in the CAN bus. A level sequence is detected in principle based on its significance or specification in accordance with the bus specification.

At least one level sequence is selected from among these level sequences and is used in the method to check whether an unauthorized physical access to the bus system, more precisely to the physical layer, is possibly present. This level sequence is referred to as a "test level sequence"; usefully, the level sequences are ones used in normal communication. A suitable test level sequence can, in particular, already be produced by the transfer of a single bit. A test level sequence can encompass, in particular, repeating test level sequence segments, i.e., for instance several bits or bit sequences one after another.

The test level sequence preferably has several sets, having predetermined pattern times, associated with it, one of the sets being selected and, upon constitution of the sampled pattern, the pattern times of that set being used as the pattern times associated with the test level sequence; and the selection of the set being modified at specified selection times. The selection is preferably made randomly. The probability of detecting an unauthorized access is increased by modifying the pattern times associated with a test level sequence. Also preferably, the selection times can be spaced apart regularly or can coincide with constitution of the sampled pattern, i.e. the set of pattern times being used is selected again each time the respective test level sequence is detected.

If a test level sequence has several sets of pattern times associated with it, corresponding reference patterns, which refer respectively to one of the pattern times and are used in the comparison step when the corresponding pattern time set is selected, are of course also determined.

The pattern times are preferably selected from regularly spaced grid times. Successive grid times thus always have the same spacing in time from one another.

Additionally or alternatively, if grid times are not used, the pattern times can also be indicated as spacings in time from a specified level transition of the test level sequence, for instance from the first level transition of the test level sequence.

If regularly spaced grid times are defined (independently of level sequences), the evaluation of the voltage signal, or the determination of binary values that then constitute the digits of the sampled pattern at the pattern times, can occur continuously. The binary values can then be buffered (e.g. in a ring buffer or a shift register), and can be used when a test level sequence is detected. After a specified time based on the longest time period that corresponds to a test level sequence, the buffered binary values can be deleted again or, for example in the case of buffering in a ring buffer, can be overwritten.

A time interval between two successive grid times is preferably less than or equal to 25 nanoseconds (ns). A high time resolution makes it possible to detect small changes in the voltage signal.

Preferably, all grid times within the detected test level sequence are selected as pattern times. The voltage signal is thereby mapped as accurately as possible into the sampled pattern. Upon comparison with the reference pattern, the form of the voltage signal is therefore tested simultaneously in a large number of aspects.

In accordance with a preferred embodiment of the present invention, it is also possible for only some of the grid times within the detected test level sequence to be selected as pattern times; also preferably, at most a tenth of the grid times are selected. This yields sampled patterns having fewer digits, thereby making possible less computation-intensive processing.

If the test level sequence encompasses repeating test level sequence segments, preferably at least one pattern time is located in each of the repeating test level sequence segments. It is thereby possible, for example, to detect a time-related change in the sampled pattern whose time constant is longer than a test level sequence segment. Particularly preferably, the pattern times are each located at a different position with respect to the beginning of the test level sequence segment. It is thereby possible (on the assumption that the repeating test level sequence segments, e.g., bits, are sufficiently identical) to sample a greater, or the entire, length of the test level sequence segment over time; this improves the result.

In accordance with an example embodiment of the present invention, the method preferably encompasses determining the reference pattern for the test level sequence, the following steps being carried out successively for one or several bus subscribers of the bus system: generating, by way of the respective bus subscriber, a reference voltage signal corresponding to the test level sequence; generating a reference signal that exhibits a first state if the reference voltage signal is above a predefined voltage threshold, and exhibits a second state if the reference voltage signal is not above the voltage threshold; constituting a binary reference pattern, a digit of the reference pattern, which is determined in such a way that it has the first value if the reference signal exhibits the first state at the respective pattern time, and has the second value if the reference signal exhibits the second state at the respective pattern time, respectively corresponding to the predetermined pattern times within the test level sequence.

In the context of the determination of reference patterns, also preferably, the respective pattern times are shifted by one grid time in one direction, and the step of constituting a reference pattern is also carried out based on the shifted pattern times, in order to constitute additional reference patterns. Cases in which the sampled pattern is shifted by one grid time thus do not erroneously lead to the assumption that an unauthorized access exists. Also preferably, two additional reference patterns are constituted for each bus subscriber for which the steps are carried out, one for a shift forward and one for a shift backward. Shifting the reference signal (in the other direction) is equivalent to shifting the grid times. It is also equivalent to shifting the sampled pattern, obtained with the unshifted pattern times, by one digit.

The method may furthermore preferably encompass: constituting a sampled signal that exhibits a first state if the voltage signal is above a predefined voltage threshold, and exhibits a second state if the voltage signal is not above the voltage threshold. The sampled signal then has, in contrast to the voltage signal, only two defined levels. Also preferably, the sampled pattern or reference pattern is constituted based on the sampled signal, the first value being allocated to the digits of the sampled pattern or reference pattern if the sampled signal is in the first state at the pattern time corresponding to the respective digit, and the second value being allocated if the sampled signal is in the second state at the pattern time corresponding to the respective digit. This is advantageous because hardware that is already present, in particular transceivers of bus subscribers, can be used in order to constitute the sampled signal, and from that the sampled pattern or reference pattern. The reason for this is that the sampled signal can be, in particular, the received signal of a transceiver (or at least of a receiver or receiving section) which is constituted in any case by a bus subscriber in order to receive data from the voltage signal. The method can thus be carried out by a bus subscriber which is already present, and which usually encompasses a transceiver and a processor.

The computation unit according to an example embodiment of the present invention, for instance a control device of a motor vehicle or a microcontroller encompassed therein, is configured to carry out, in particular by programmed execution, a method according to the present invention. The computation unit preferably encompasses a transceiver or receiver.

Implementation of a method according to an example embodiment of the present invention in the form of a computer program or computer program product having program code for carrying out all method steps is also advantageous, since this results in particularly low costs, especially if an executing control device is already being used for further tasks and is therefore present in any case. Suitable data media for furnishing the computer program are, in particular, magnetic, optical, and electrical memories, for instance hard drives, flash memories, EEPROMs, DVDs, and many more. Downloading of a program via computer networks (internet, intranet, etc.) is also possible.

Further advantages and embodiments of the present invention are evident from the description herein and from the figures. The present invention is schematically depicted in the figures on the basis of exemplifying embodiments, and will be described below with reference to the figures.

DETAILED DESCRIPTION OF EXAMPLE EMBODIMENTS

Figure 1:
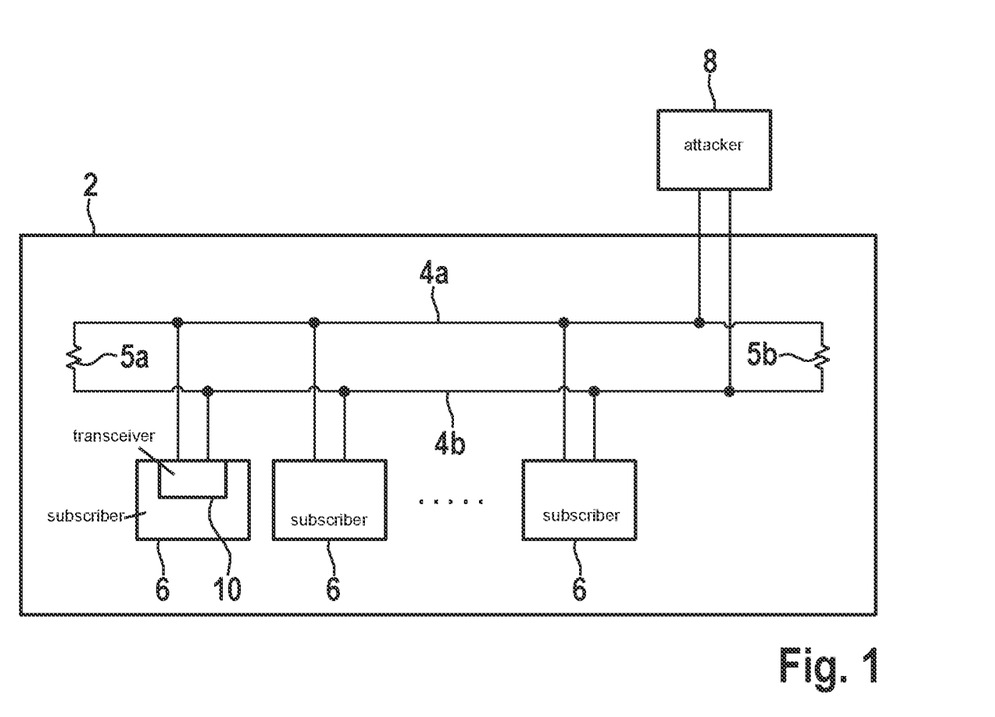
FIG. 1 shows an exemplifying configuration of a bus system, and an attacker.

FIG. 1 depicts an exemplifying configuration of a bus system, in particular a bus system based on differential voltage signals, for example a CAN bus system; and an attacker. Bus system 2 encompasses on the one hand leads 4a, 4b by way of which the voltage signals are transferred and which are connected to one another via terminating resistors 5a, 5b that represent the central impedance of the bus system, and on the other hand several bus subscribers 6, which are connected to the two bus lines 4a, 4b in order to communicate with one another via the bus. The bus subscribers use for that purpose differential voltages between the two bus leads, which are generated and read out by way of transceivers. Examples of bus subscribers 6 are control devices of a motor vehicle or of a machine, which transfer control data; or sensors that transfer sensor data, for example, to control devices. Depicted in one of the bus subscribers by way of example is a transceiver 10 by way of which the bus subscriber generates voltage signals on the bus leads and reads them out therefrom; the other bus subscribers can of course also encompass such a transceiver. In this Application the term "bus subscriber" refers to ordinary bus subscribers that are authorized to access the bus, as opposed to an attacker accessing the bus without authorization.

Data transfer occurs, for example, via transceiver 10, which on the one hand converts received data into signals suitable for processing by the microcontroller and conveys them to the latter or to an interface module therein, for example a CAN module, and on the other hand receives data for transmission, or corresponding signals, from the interface module and generates therefrom voltages on bus leads 4a, 4b which correspond to those data in accordance with the bus specification. Alternatively, a generic module such as the one described e.g. in German Patent Application No. DE 10 2013 210 182 A1, for example a timer module, can be used instead of a special interface module.

Attacker 8, for instance a device that also contains a transceiver or at least one transmitter or receiver, for example a so-called OBD plug, has physical access to the bus system and can thereby create a connection to leads 4a, 4b. Attacker 8 is thus capable of listening in on messages transmitted via the bus or reading out the corresponding voltage signals, and/or can itself transmit messages or generate corresponding voltage signals.

Figure 2A:
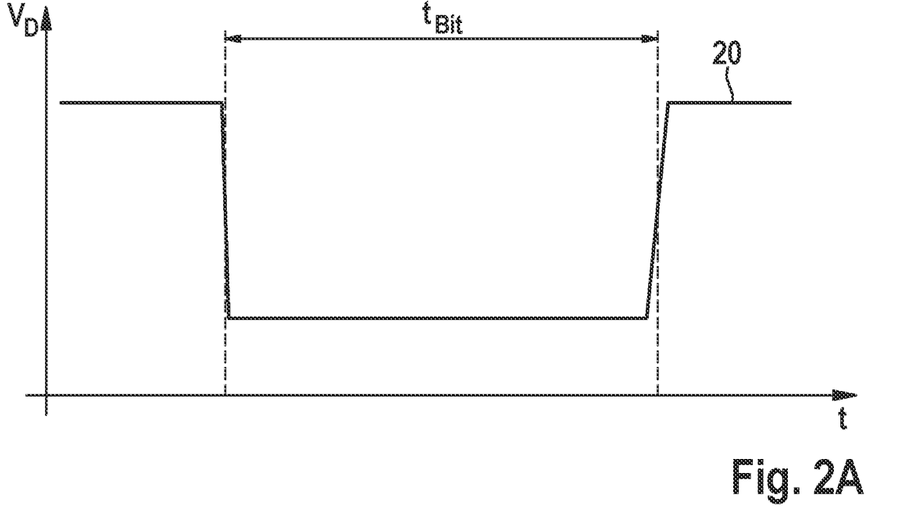
FIGS. 2A and 2B show an ideal voltage profile for transferring a bit having a value of 1, and the corresponding actual voltage profile.
Figure 2B:
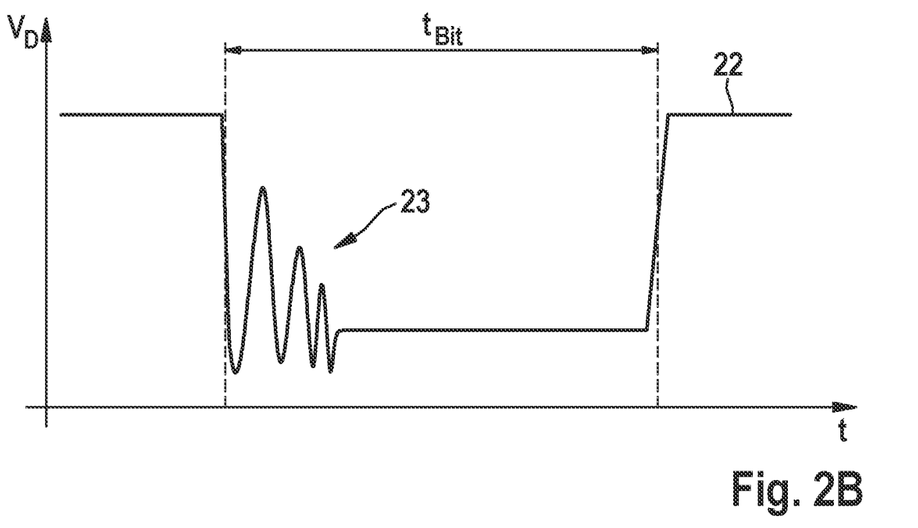

FIGS. 2A and 2B depict an ideal differential voltage profile 20, for example in accordance with the CAN bus specification, which serves to transfer a bit having a specified logical value, and a corresponding actual differential voltage profile 22. In each case, the differential voltage $V_D$ is plotted against time t. In the ideal differential voltage profile 20 (FIG. 2A) that is generated by the transmitter, firstly a relatively high differential voltage is present (at least 2 V in the CAN bus, called a "dominant state") which then transitions via a falling edge into a low differential voltage (0 V in the CAN bus, called a "recessive state") and then transitions via a rising edge back to the high differential voltage. A level sequence of this kind serves in the CAN bus for transmission of a bit that has the logical value of 1, if the time span between the falling and the rising edge is equal to the time span $t_{bit}$ predetermined in accordance with the CAN bus system specification.

The physical layer, i.e., bus leads 4a, 4b together with bus subscribers 6, has electrical properties, however, in particular inductances and capacitances, that interfere with this idealized differential voltage profile. This results in interference, for example changes in edge slopes, reflections, oscillations in the voltage profile, and the like. This interference depends on the specific implementation of the physical layer, i.e. on the design of an actual bus system (e.g. length of the leads, number of subscribers and where they are connected to the leads, electrical properties of the subscribers' transceivers, etc.). One such actual differential voltage profile 22 is depicted by way of example in FIG. 2B. Here, oscillations 23 (also referred to as "ringing") in the differential voltage occur after the falling edge.

Because the interference depends on the design of the bus system, it is characteristic of the particular specific bus system. If a further subscriber or, as in FIG. 1, an attacker 8 is connected to the bus system, this produces a change in the interference, so that a possible manipulation attempt or possible unauthorized access to the physical layer can be detected.

Figure 3A:
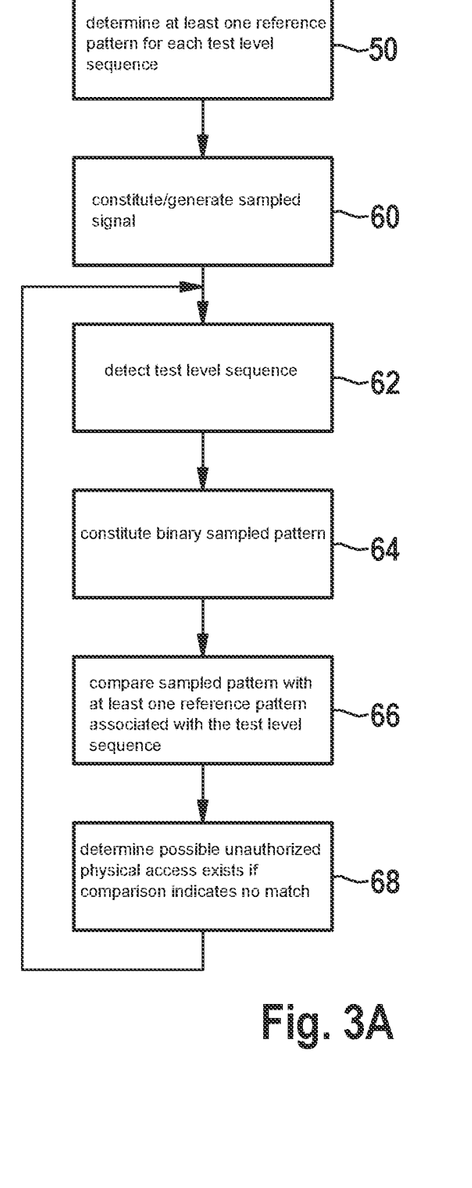
FIG. 3A is a flow chart in accordance with a preferred embodiment of the method according to the present invention.

FIG. 3A is a flow chart in accordance with a preferred embodiment of the method according to the present invention. The method can be carried out by one (or, mutually independently, by several) of the bus subscribers, or a separate computation unit can be provided for it, i.e. a monitoring subscriber on the bus which serves to detect an unauthorized physical access to the bus system; a monitoring subscriber of this kind can also, if applicable, carry out other additional methods for manipulation detection.

Figure 3B:
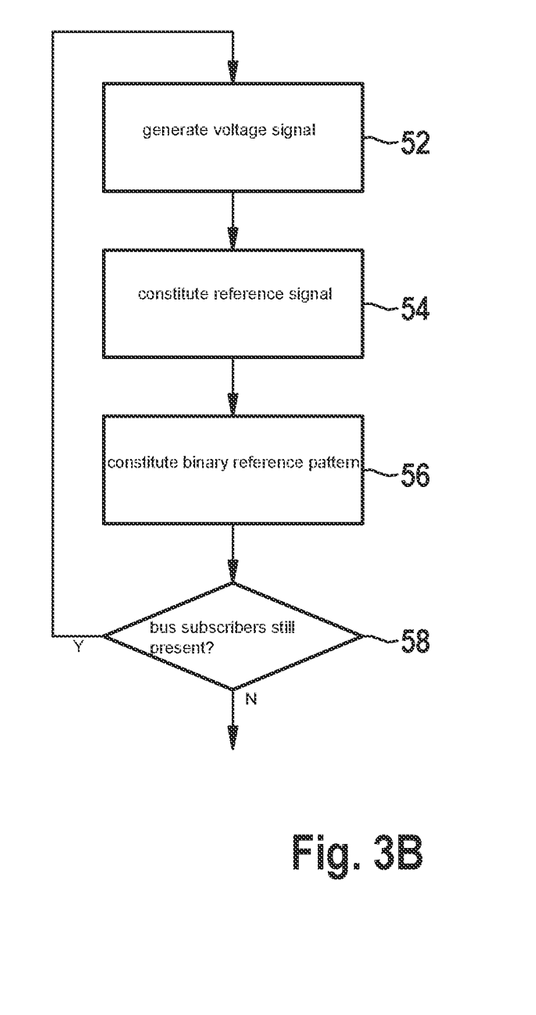
FIG. 3B is a flow chart that illustrates a preferred procedure in the context of the determination of reference patterns.

In step 50, which is carried out before further execution of the method, firstly at least one reference pattern is determined for each test level sequence. The voltage profile shown in FIGS. 2A and 2B is one example of a test level sequence. For this, with the bus system in a state in which it is certain that no unauthorized physical access to the system exists, for instance upon manufacture of the bus system, a voltage signal or reference voltage signal that corresponds to the respective test level sequence is generated (for example, by one of the bus subscribers) on the bus (more precisely, on the bus leads). A sampled pattern, which is the reference pattern, is then constituted from this reference voltage signal in accordance with the steps described below. The procedure is preferably in accordance with steps 60, 64. A preferred procedure in the context of determining reference patterns is shown in FIG. 3B. If several sets of pattern times are provided for a test level sequence, at least one reference pattern is determined for each of the sets.

In the preferred step 60, a sampled signal is constituted or generated which exhibits a first state if the voltage signal is above a predefined voltage threshold, and exhibits a second state if the voltage signal is not above the voltage threshold. The sampled signal is a voltage signal in which the first state corresponds to a first level and the second state to a second level. If the voltage threshold is the one that is used in the context of data transfer in accordance with the bus specification in order to differentiate levels or level ranges in the voltage signal, the sampled signal in principle represents the received signal, i.e. does not need to be separately generated. It can then derive, for example, from a transceiver (e.g. 10 in FIG. 1).

In step 62, a test level sequence in the voltage signal (or the sampled signal) is detected, i.e. the profile of the voltage signal is checked as to whether the respective test level sequence is contained therein. Because test level sequences have at least in part a specified meaning in accordance with the bus specification, for example represent a transferred bit having a specified value, this can easily be detected on the basis of that meaning. The test level sequence can also, if applicable, be detected in the sampled signal, in particular if the latter is the received signal and is evaluated by the receiver in accordance with the bus specification.

Once a test level sequence has been detected, a binary sampled pattern is constituted in step 64. For this, the sampled signal is preferably evaluated at specified pattern times that are associated with the detected test level sequence; depending on the state in which the sampled signal is at a respective pattern time, a first value (e.g. a logical "1") is assigned to a digit or a bit of the sampled pattern if the first state exists, and a second value (e.g. a logical "0") is assigned if the second state exists. The sampled pattern constitutes in principle a bit pattern; the digits correspond to individual bits of the bit pattern. The pattern times are specified times within the test level sequence. A specified level transition of the test level sequence, for example an initial edge in the voltage signal, e.g. the initial falling edge in the voltage signal shown in FIG. 2B, can serve as a reference point. If step 60, i.e. generation of a sampled signal, is omitted, the sampled pattern can also be constituted directly from the voltage signal, the first or the second values being respectively assigned to a digit of the sampled pattern depending on whether or not the voltage signal is above the voltage threshold at the respective grid time. If several sets of pattern times are associated with the detected test level sequence, the pattern times of one of the sets are selected and are used in the determination of the sampled pattern. This selection can be repeated at specified selection times in a preferably random fashion, for example each time the test level sequence occurs and is detected, or at regular time intervals.

In step 66, the sampled pattern constituted in step 64 is compared with at least one reference pattern associated with the test level sequence, checking whether or not a match exists (in the sense that all the digits or bits match). If the detected test level sequence has several sets of pattern times associated with it, the reference pattern used in the comparison is the at least one that was determined using the selected pattern time set.

If it is ascertained in the context of the match check that no reference pattern that is associated with the test level sequence matches the sampled pattern, it is inferred or determined in step 68 that a possible unauthorized physical access exists. Corresponding measures can then be taken. In addition, a warning message can be transmitted in which, for example, an operator or another device is notified that an unauthorized access to the bus system is possibly occurring. For instance, the bus system can then be further analyzed by a specialist, for instance visually inspected in order to ascertain whether physical modifications (connection of an attacker to the bus) have been made.

If, on the other hand, a match with the reference pattern is ascertained, execution can branch back to step 62 and the voltage signal or sampled signal can be monitored for a further occurrence of a test level sequence.

FIG. 3B illustrates in a flow chart a preferred procedure when determining reference patterns; this corresponds to step 50 in FIG. 3A. This can be carried out for one or several test level sequences, the procedure for one test level sequence being explained below.

In step 52, a voltage signal, which corresponds to the test level sequence and which constitutes a reference voltage signal, is generated by one of the bus subscribers.

Preferably, in step 54 a reference signal is constituted which exhibits a first state if the reference voltage signal is above a predefined voltage threshold, and exhibits a second state if the reference voltage signal is not above the voltage threshold. This step can be performed by any one of the bus subscribers (that encompasses a receiver or transceiver), in particular the bus subscriber that is carrying out the method according to the present invention for detecting an unauthorized physical access to the bus system. If a separate monitoring subscriber is provided on the bus for carrying out the method, it can carry out this step.

In step 56 a binary reference pattern is constituted, a digit of the reference pattern corresponding respectively to the predetermined pattern times within the test level sequence, the digit being determined in such a way that it has the first value if the reference signal exhibits the first state at the respective pattern time, and has the second value if the reference signal exhibits the second state at the respective pattern time. In other words, the reference pattern is constituted as a sampled pattern based on the reference voltage signal. In general, it is also possible to constitute the reference signal directly from the reference voltage signal, the first or the second value being respectively assigned to a digit of the reference pattern depending on whether or not the voltage signal is above the voltage threshold at the respective grid time.

Step 58 checks whether bus subscribers for which steps 52 to 56 are to be carried out are still present. If so, execution branches back to step 52 and the method is repeated for another bus subscriber. Otherwise the reference patterns constituted respectively (for different bus subscribers) in step 56 are assigned to the test level sequence in order to constitute reference patterns assigned to the test level sequence; if applicable, further test level sequences can be determined in a different manner, for example based on the ones determined in step 60 by shifting by one digit (bit). Then, or once the procedure of FIG. 3B has been carried out for further test level sequences, execution of the method according to the present invention continues, for example with step 60 in FIG. 3A.

Figure 4:
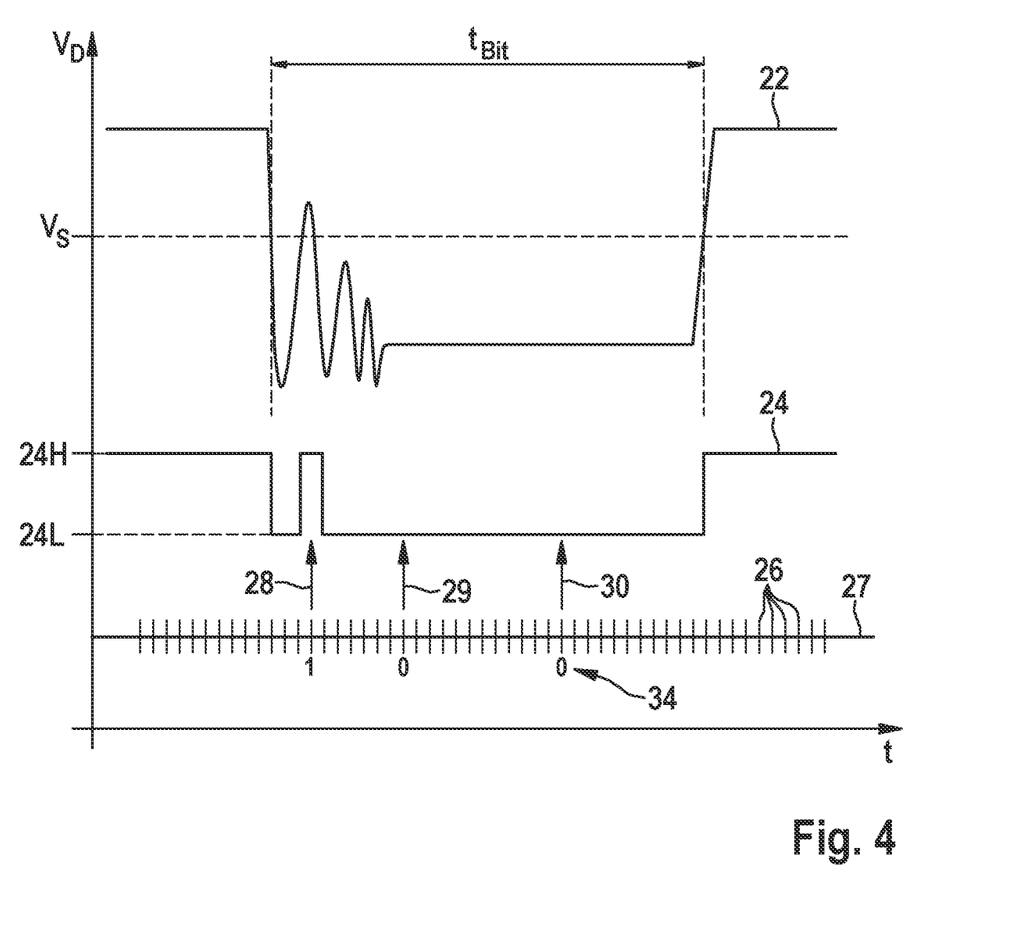
FIGS. 4 and 5 illustrate, by way of example, the constitution of sampled signals and sampled patterns from a voltage signal.
Figure 5:
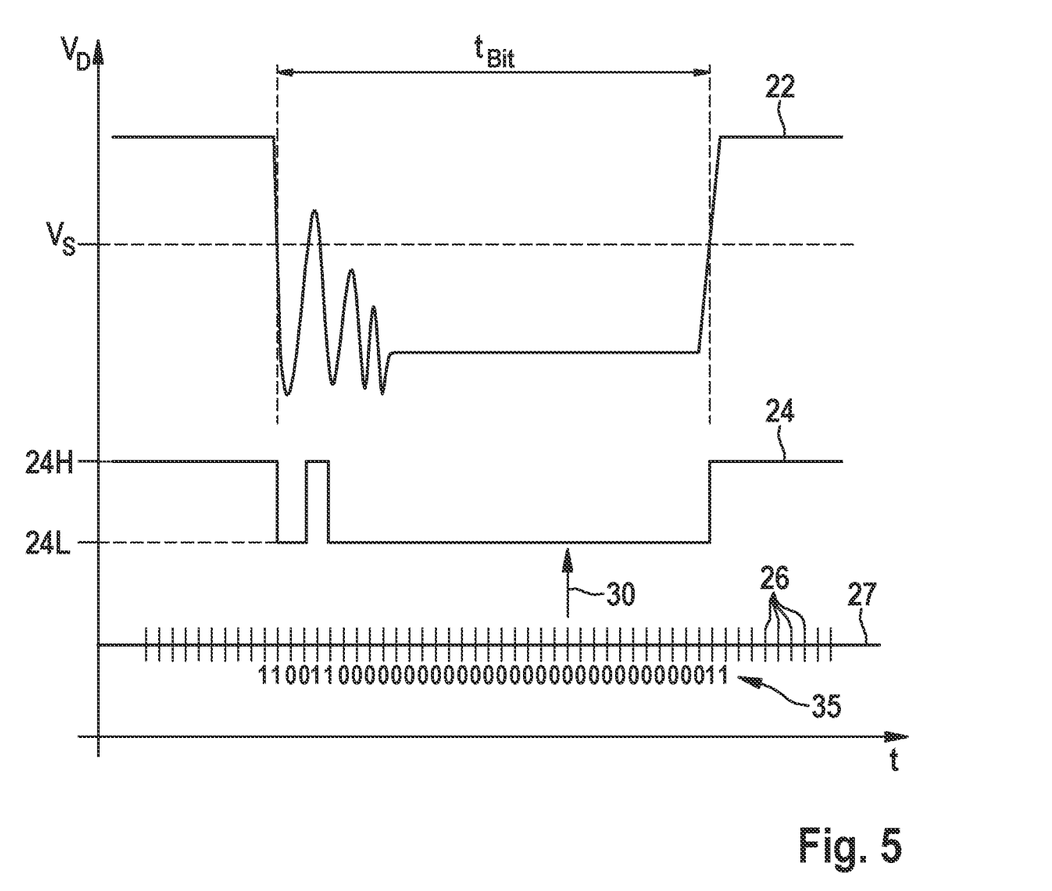

FIGS. 4 and 5 illustrate by way of example the manner in which corresponding sampled signals and sampled patterns are constituted from the voltage signal, shown in FIG. 2B, which represents the test level sequence, different numbers of sampling times being used in the two Figures. In each of the Figures, voltage signal 22 (differential voltage signal $V_D$) from FIG. 2B, which in the CAN bus, for example, represents a bit having the logical value of 1, is plotted at the top. The abscissa corresponds, as usual, to time t; a corresponding time axis is plotted at the lower edge of the Figures. Also plotted in the course of the voltage signal is voltage threshold $V_s$ in accordance with which voltage signal 22 is converted into a sampled signal. Voltage threshold $V_s$ is usefully the same one used in the context of data transfer according to the bus specification in order to distinguish levels or level ranges in the voltage signal, so that no additional hardware is needed in order to carry out the method, but existing receivers or transceivers can instead be used.

From voltage signal 22, sampled signal 24 is generated; the latter assumes a first state 24H or a second state 24L depending on whether or not the voltage signal is above voltage threshold $V_s$. If the voltage threshold is the one with which levels or level regions in the voltage signal are to be distinguished in accordance with the bus specification, the sampled signal then corresponds to the received signal (for example, the Rx signal in the CAN bus) that is generated by a receiving section or a transceiver; the sampled signal thus does not need to be generated separately or additionally, but an already existing signal can instead be used.

In accordance with the embodiment, regularly spaced grid times 26 are defined and are each plotted along an axis 27 in the Figures. The pattern times are each selected from these grid times.

In FIG. 4, three pattern times 28, 29, 30, which are selected from grid times 26, are used to constitute the sampled pattern; a sampled pattern 34 having three digits or bits is thus obtained. For the situation in which no grid times are predefined, pattern times 28, 29, 30 can also be indicated as time offsets from the initial falling edge, i.e. the High-Low level transition that can be used as the beginning of the test level sequence. Because, as explained, sampled signal 24 can also be the received signal (Rx in the CAN bus), the pattern time having the reference character 30 is simultaneously the time at which, in accordance with the bus specification, the transmitted bit is accepted by the receiver. Sampled pattern 34 is depicted in the form of a bit pattern made up of ones and zeroes. Each bit (digit) of the sampled pattern corresponds to one of the pattern times, the value "1" being assigned to the respective bit if sampled signal 24 is in first state 24H, and the value "0" being assigned if sampled signal 24 is in second state 24L. Sampled pattern 34 that is thereby obtained is correspondingly the bit pattern "100". If the first oscillation peak, which in FIG. 4 is located exactly at first pattern time 28, shifts slightly backward (for example because an attacker is connected to the bus lines and is thereby modifying the electrical properties) so that it does not occur until after first pattern time 28, the resulting sampled pattern would be "000", so that a change with respect to the bit pattern "100" can be identified. A different number (other than three) of pattern times can be selected; the sampled patterns thereby constituted then have a corresponding number of digits or bits.

Alternatively, provision can be made that one or several pattern times, for instance pattern times 28, are shifted from bit to bit. In this context a bit represents, for example, only one repeating test level sequence segment of a longer test level sequence (which then encompasses several bits). Pattern time 28 is then located, in each of the repeating test level sequence segments, at a different position with respect to the beginning of the test level sequence segment. Shifting of a pattern time makes it possible, similarly to the situation in FIG. 5, to sample a longer region of a test level sequence segment, or in fact the entire test level sequence segment.

In FIG. 5, all grid times 26 are used as pattern times in order to constitute the sampled pattern, i.e. a sampled pattern 35 having a corresponding number of digits or bits is obtained, i.e. corresponding to the number of grid times within the test level sequence. The edges here belong the test level sequence and are recognizable in the sampled pattern. Unlike in FIG. 4, in FIG. 5 the grid times are not labeled with arrows; only the time at which the transmitted bit is received by the receiver is still labeled with arrow 30. If the procedure used when constituting sampled pattern 35 is again as described above, the bit pattern "1101100000000000000000000000000011" is correspondingly obtained. This embodiment offers higher resolution (for example, the first oscillation peak is represented here by two bits having the value "1"), so that smaller electrical changes in the bus system can be detected.

What is claimed is:

1. A method for detecting an unauthorized physical access to a bus system in which data are transferred in accordance with a bus specification with one or several level sequences in a voltage signal, the method comprising the following steps:
   detecting a test level sequence in the voltage signal;
   constituting a binary sampled pattern by sampling the voltage signal at specified pattern times associated with the detected test level sequence, and assigning a first value when the voltage signal is above a predefined voltage threshold at each respective pattern time of the pattern times, and a second value when the voltage signal is not above the voltage threshold at the respective pattern time;
   comparing the sampled pattern with a reference pattern that is associated with the detected test level sequence and that was constituted for the test level sequence as a sampled pattern in a state of the bus system during which no unauthorized access thereto existed; and
   determining that a possible unauthorized physical access exists based on ascertaining upon the comparison that the reference pattern does not match the sampled pattern.

2. The method as recited in claim 1, wherein the pattern times are selected from regularly spaced grid times.

3. The method as recited in claim 2, wherein a time interval between two successive grid times is less than or equal to 25 ns.

4. The method as recited in claim 2, wherein all the grid times within the detected test level sequence are selected as pattern times.

5. The method as recited in claim 2, wherein only some of the grid times within the detected test level sequence are selected as pattern times.

6. The method as recited in claim 5, wherein at most one-tenth of the grid times are selected as pattern times.

7. The method as recited in claim 5, wherein at least one pattern time is located in each of the repeating test level sequence segments, each at a different position with respect to a beginning of the test level sequence segment.

8. The method as recited in claim 2, wherein the test level sequence has several sets having predetermined pattern times associated with it, one set of the sets being selected, and the pattern times of the selecting set being used in the context of constitution of the sampled pattern as the pattern times associated with the test level sequence, and the selection of the set being modified at specified selection times.

9. The method as recited in claim 8, wherein the selection is made randomly.

10. The method as recited in claim 8, wherein the respective pattern times are shifted by one grid time in one direction, and the step of constituting a reference pattern is also carried out based on the shifted pattern times, in order to constitute additional reference patterns.

11. The method as recited in claim 8, further comprising:
constituting a sampled signal that exhibits a first state if the voltage signal is above a predefined voltage threshold, and exhibits a second state if the voltage signal is not above the voltage threshold; and
constituting the reference pattern, based on the sampled signal, the first value being allocated to the digits of the reference pattern when the sampled signal is in the first state at the pattern time corresponding to the respective digit, and the second value being allocated when the sampled signal is in the second state at the pattern time corresponding to the respective digit.

12. The method as recited in claim 1, wherein the test level sequence has repeating test level sequence segments.

13. The method as recited in claim 1, further comprising:
determining the reference pattern for the test level sequence, the following steps being carried out successively for at least one respective subscriber of the bus system:
generating, by way of the respective bus subscriber, a reference voltage signal corresponding to the test level sequence;
generating a reference signal that exhibits a first state when the reference voltage signal is above a predefined voltage threshold, and exhibits a second state when the reference voltage signal is not above the voltage threshold; and
constituting a binary reference pattern, a digit of the reference pattern, which is determined in such a way that it has the first value when the reference signal exhibits the first state at the respective pattern time, and has the second value when the reference signal exhibits the second state at the respective pattern time, respectively corresponding to the specified pattern times within the test level sequence.

14. The method as recited in claim 1, further comprising:
constituting a sampled signal that exhibits a first state when the voltage signal is above a predefined voltage threshold, and exhibits a second state when the voltage signal is not above the voltage threshold; and
constituting the sampled pattern based on the sampled signal, the first value being allocated to the digits of the sampled pattern when the sampled signal is in the first state at a pattern time corresponding to the respective digit, and the second value being allocated when the sampled signal is in the second state at the pattern time corresponding to the respective digit.

15. A computation unit configured to detect an unauthorized physical access to a bus system in which data are transferred in accordance with a bus specification with one or several level sequences in a voltage signal, the computation unit configured to:
detect a test level sequence in the voltage signal;
constitute a binary sampled pattern by sampling the voltage signal at specified pattern times associated with the detected test level sequence, and assigning a first value when the voltage signal is above a predefined voltage threshold at each respective pattern time of the pattern times, and a second value when the voltage signal is not above the voltage threshold at the respective pattern time;
compare the sampled pattern with a reference pattern that is associated with the detected test level sequence and that was constituted for the test level sequence as a sampled pattern in a state of the bus system during which no unauthorized access thereto existed; and
determine that a possible unauthorized physical access exists based on ascertaining upon the comparison that the reference pattern does not match the sampled pattern.

16. The computation unit as recited in claim 15, wherein the computation unit includes a receiver.

17. A non-transitory machine-readable storage medium on which is stored a computer program for detecting an unauthorized physical access to a bus system in which data are transferred in accordance with a bus specification with one or several level sequences in a voltage signal, the computer program, when executed by a computer, causing the computer to perform the following steps:
detecting a test level sequence in the voltage signal;
constituting a binary sampled pattern by sampling the voltage signal at specified pattern times associated with the detected test level sequence, and assigning a first value when the voltage signal is above a predefined voltage threshold at each respective pattern time of the pattern times, and a second value when the voltage signal is not above the voltage threshold at the respective pattern time;
comparing the sampled pattern with a reference pattern that is associated with the detected test level sequence and that was constituted for the test level sequence as a sampled pattern in a state of the bus system during which no unauthorized access thereto existed; and
determining that a possible unauthorized physical access exists based on ascertaining upon the comparison that the reference pattern does not match the sampled pattern.

* * * * *